United States Patent
Choo et al.

(10) Patent No.: US 9,853,766 B2
(45) Date of Patent: Dec. 26, 2017

(54) RADIO COMMUNICATION DEVICES, ACCESS POINTS, METHOD FOR CONTROLLING A RADIO COMMUNICATION DEVICE, AND METHODS FOR CONTROLLING AN ACCESS POINT

(71) Applicant: Agency for Science, Technology and Research, Singapore (SG)

(72) Inventors: Li Chia Choo, Singapore (SG); Wai Leong Yeow, Singapore (SG); Zhongding Lei, Singapore (SG); Shoukang Zheng, Singapore (SG); Haiguang Wang, Singapore (SG)

(73) Assignee: Agency for Science, Technology and Research, Singapore (SG)

(*) Notice: Subject to any disclaimer, the term of this patent is extended or adjusted under 35 U.S.C. 154(b) by 0 days.

(21) Appl. No.: 14/441,399

(22) PCT Filed: Nov. 11, 2013

(86) PCT No.: PCT/SG2013/000479
§ 371 (c)(1),
(2) Date: May 7, 2016

(87) PCT Pub. No.: WO2014/074069
PCT Pub. Date: May 15, 2014

(65) Prior Publication Data
US 2015/0318956 A1    Nov. 5, 2015

(30) Foreign Application Priority Data

| Nov. 9, 2012 | (SG) | 201208312 |
| Dec. 12, 2012 | (SG) | 201209132 |
| May 10, 2013 | (SG) | 201303655 |

(51) Int. Cl.
H04L 1/00    (2006.01)
H04L 1/16    (2006.01)
(Continued)

(52) U.S. Cl.
CPC ............. *H04L 1/00* (2013.01); *H04J 3/22* (2013.01); *H04L 1/0057* (2013.01);
(Continued)

(58) Field of Classification Search
CPC .... H03M 13/47; H03M 13/09; H03M 13/091; H03M 13/093; H04L 1/0041;
(Continued)

(56) References Cited

U.S. PATENT DOCUMENTS

| 2003/0103480 A1* | 6/2003 | You ...................... H04L 1/0041 370/335 |
| 2007/0014237 A1 | 1/2007 | Nishibayashi et al. |

(Continued)

OTHER PUBLICATIONS

IEEE Standards Association, Part 11: Wireless LAN Medium Access Control (MAC) and Physical Layer (PHY) Specifications, IEEE Standard for Information technology—Telecommunications and information exchange between systems Local and metropolitan area networks—Specific requirements, IEEE Std 802.11 (IEEE 2012).
(Continued)

*Primary Examiner* — Aristocratis Fotakis
(74) *Attorney, Agent, or Firm* — K. David Crockett, Esq.; Niky Economy Syrengelas, Esq.; Crockett & Crockett, PC (57) ABSTRACT

According to various embodiments, a radio communication device may be provided. The radio communication device may include: a transmitter configured to transmit a null data packet. The null data packet may include acknowledgement data indicating acknowledgements for a plurality of packets. The null data packet may include a cyclic redundancy check field configured to provide information based on which the null data packet or acknowledgements may be checked for
(Continued)

errors. The null data packet may include further information based on which the acknowledgements may be checked for errors.

19 Claims, 5 Drawing Sheets

(51) Int. Cl.
*H04L 5/00* (2006.01)
*H04J 3/22* (2006.01)
*H04L 1/08* (2006.01)
*H04L 1/18* (2006.01)

(52) U.S. Cl.
CPC .......... *H04L 1/0061* (2013.01); *H04L 1/0073* (2013.01); *H04L 1/08* (2013.01); *H04L 1/16* (2013.01); *H04L 1/1614* (2013.01); *H04L 1/1664* (2013.01); *H04L 5/0007* (2013.01); *H04L 1/1858* (2013.01)

(58) Field of Classification Search
CPC ... H04L 1/1614; H04L 1/0061; H04L 1/0045; H04L 5/0055; H04L 1/0057
See application file for complete search history.

(56) References Cited

U.S. PATENT DOCUMENTS

| | | | |
|---|---|---|---|
| 2011/0032925 A1* | 2/2011 | Lee | H04L 1/1621 370/345 |
| 2013/0170345 A1* | 7/2013 | Merlin | H04W 28/065 370/230 |
| 2013/0223212 A1* | 8/2013 | Asterjadhi | H04L 1/0025 370/230 |
| 2013/0223345 A1* | 8/2013 | Asterjadhi | H04L 69/04 370/328 |
| 2014/0233551 A1* | 8/2014 | Wentink | H04L 1/1621 370/338 |
| 2015/0244619 A1* | 8/2015 | Zheng | H03M 13/09 370/392 |

OTHER PUBLICATIONS

Park, Specification Framework for TGah, TGah Spec Framework, IEEE 802.11-11/1137r14, (Mar. 20, 2013).

* cited by examiner

Transmit a null data packet comprising acknowledgement data indicating acknowledgements for a plurality of packets

RADIO COMMUNICATION DEVICES, ACCESS POINTS, METHOD FOR CONTROLLING A RADIO COMMUNICATION DEVICE, AND METHODS FOR CONTROLLING AN ACCESS POINT

CROSS-REFERENCE TO RELATED APPLICATIONS

The present application claims the benefit of the Singapore patent application No. 201208312-7 filed on 9 Nov. 2012, the Singapore patent application No. 201209132-8 filed on 12 Dec. 2012, and the Singapore patent application No. 201303655-3 filed on 10 May 2013, the entire contents of which are incorporated herein by reference for all purposes.

TECHNICAL FIELD

Embodiments relate generally to radio communication devices, access points, method for controlling a radio communication device, and methods for controlling an access point.

BACKGROUND

In a communication between a radio communication device and an access point, there may be a high number of packets transmitted from the access point to the radio communication device, which the radio communication device needs to acknowledge. Thus, there may be a need for an efficient way for providing these acknowledgements.

SUMMARY

According to various embodiments, a radio communication device may be provided. The radio communication device may include: a transmitter configured to transmit a null data packet. The null data packet may include acknowledgement data indicating acknowledgements for a plurality of packets. The null data packet may include a cyclic redundancy check field configured to provide information based on which the null data packet or acknowledgements may be checked for errors. The null data packet may include further information based on which the acknowledgements may be checked for errors.

According to various embodiments, an access point may be provided. The access point may include: a receiver configured to receive a null data packet. The null data packet may include acknowledgement data indicating acknowledgements for a plurality of packets. The null data packet may include a cyclic redundancy check field configured to provide information based on which the null data packet or acknowledgements may be checked for errors. The null data packet may include further information based on which the acknowledgements may be checked for errors.

According to various embodiments, a method for controlling a radio communication device may be provided. The method may include: transmitting a null data packet. The null data packet may include acknowledgement data indicating acknowledgements for a plurality of packets. The null data packet may include a cyclic redundancy check field configured to provide information based on which the null data packet or acknowledgements may be checked for errors. The null data packet may include further information based on which the acknowledgements may be checked for errors.

According to various embodiments, a method for controlling an access point may be provided. The method may include: receiving a null data packet. The null data packet may include acknowledgement data indicating acknowledgements for a plurality of packets. The null data packet may include a cyclic redundancy check field configured to provide information based on which the null data packet or acknowledgements may be checked for errors. The null data packet may include further information based on which the acknowledgements may be checked for errors.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments are described with reference to the following drawings, in which.

DESCRIPTION

Embodiments described below in context of the devices are analogously valid for the respective methods, and vice versa. Furthermore, it will be understood that the embodiments described below may be combined, for example, a part of one embodiment may be combined with a part of another embodiment.

In this context, the radio communication device as described in this description may include a memory which is for example used in the processing carried out in the radio communication device. In this context, the access point as described in this description may include a memory which is for example used in the processing carried out in the access point. A memory used in the embodiments may be a volatile memory, for example a DRAM (Dynamic Random Access Memory) or a non-volatile memory, for example a PROM (Programmable Read Only Memory), an EPROM (Erasable PROM), EEPROM (Electrically Erasable PROM), or a flash memory, e.g., a floating gate memory, a charge trapping memory, an MRAM (Magnetoresistive Random Access Memory) or a PCRAM (Phase Change Random Access Memory).

In an embodiment, a "circuit" may be understood as any kind of a logic implementing entity, which may be special purpose circuitry or a processor executing software stored in a memory, firmware, or any combination thereof. Thus, in an embodiment, a "circuit" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "circuit" may also be a processor executing software, e.g. any kind of computer program, e.g. a computer program using a virtual machine code such as e.g. Java. Any other kind of implementation of the respective functions which will be described in more detail below may also be understood as a "circuit" in accordance with an alternative embodiment.

Figure 1A:
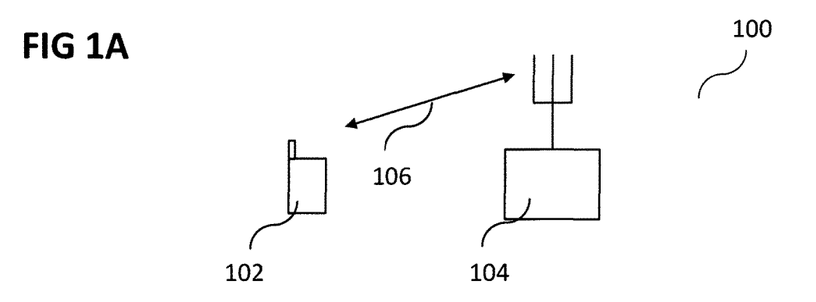
FIG. 1A shows a mobile radio communication system according to various embodiments.

FIG. 1A shows a mobile radio communication system 100 according to various embodiments. A radio communication terminal 102 (for example a mobile station, for example referred to by STA) may communicate with an access point 104, like indicated by arrow 106. The access point 104 may indicate to the station 102 when it has data for the station 102.

In a communication between a radio communication device and an access point, there may be a high number of packets transmitted from the access point to the radio communication device, which the radio communication device needs to acknowledge. Thus, there may be a need for an efficient way for providing these acknowledgements.

According to various embodiments, methods for Improving Block Ack Operation in IEEE 802.11 networks may be provided.

The Block Acknowledgement (BA) function is a feature in the IEEE 802.11 standard used to enhance throughput by reducing signaling overhead. Without BA, a station (STA) may return an acknowledgement for every data frame received. With BA enabled, the station may return one single BA frame for multiple data frames received.

In the immediate BA mode in IEEE 802.11, the acknowledging STA is required to transmit the BA frame with the same data rate as that of the eliciting data frames. This is usually not a problem with symmetrical links, i.e., the data originating STA and the acknowledging STA are of have the same radio capability, use the same transmit power and have similar channel conditions both ways.

However, the assumption is not true in general and the asymmetric problem may be exemplified in the upcoming 802.11ah standard, which task group is established for supporting radio band below 1 GHz with the coverage by a single Access Point (AP) extended form a few hundred meters to 1 km, and supports low-power devices in some use-cases.

In asymmetric link cases where the data originating STA is of higher radio capability or transmit power, it may not receive the BA frame from the acknowledging STA, or may receive erroneous BA frames due to false positives in integrity checks. The former case causes the data originating STA to re-request a BA frame from the acknowledging STA and thereby wasting the precious radio resource. The latter case may cause the data originating STA to unnecessarily retransmit data frames (and wasting radio resource), or prematurely drop data frames before they are received.

Figure 1B:
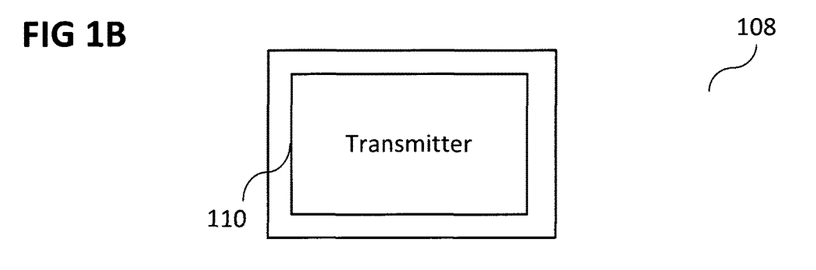
FIG. 1B shows a radio communication device according to various embodiments.

FIG. 1B shows a radio communication device 108 according to various embodiments. The radio communication device 108 may include a transmitter 110 configured to transmit (for example to an access point) a null data packet. The null data packet may include acknowledgement data indicating acknowledgements for a plurality of packets (for example received in the radio communication device 108 from the access point). The null data packet may include a cyclic redundancy check field configured to provide information based on which the null data packet may be checked for errors. The null data packet may include further information based on which the acknowledgements may be checked for errors.

In other words, the null data packet including a short block acknowledgement may include further measures besides the commonly provided CRC (cyclic redundancy check) field that may allow the access point to determine whether the short block acknowledgement has been received properly.

According to various embodiments, the null data packet may include a cyclic redundancy check field configured to provide information based on which the acknowledgements may be checked for errors.

According to various embodiments, the further information may include or may be the acknowledgements which are encoded.

According to various embodiments, the acknowledgements which are encoded may be provided as the acknowledgement data to enable checking for errors in the acknowledgements.

According to various embodiments, the further information may include or may be the acknowledgements which are processed using a forward error correction code. A variant of a forward error correction code is a repetition code, where the acknowledgements are repeated (in other words: the acknowledgements, which may be processed using a forward error correction code, are processed by a repetition code, a variant of a forward error correction code, by repeating the acknowledgements).

According to various embodiments, the acknowledgements which are processed using a forward error correction code may be provided as the acknowledgement data.

According to various embodiments, the null data packet may include a reduced number of bits for a BAID field and an increased number of bits for the acknowledgement data.

According to various embodiments, the further information may include additional bits for the cyclic redundancy check field.

According to various embodiments, the null data packet may include a reduced number of bits for a BAID field, a reduced number of bits for the acknowledgement data, and an increased number of bits in the cyclic redundancy check field.

According to various embodiments, the further information may include or may be a further cyclic redundancy check field.

According to various embodiments, the null data packet may include a reduced number of bits for a BAID field, with a size reduced by a size of the further cyclic redundancy check field.

According to various embodiments, the null data packet may include a reduced number of bits for the acknowledgement data, reduced by a size of the further cyclic redundancy check field.

According to various embodiments, the null data packet may include a reduced number of bits for a BAID field and a reduced number of bits for the acknowledgement data, reduced in sum by a size of the further cyclic redundancy check field.

According to various embodiments, the further information may include or may be masked a priori information.

According to various embodiments, the masking operation may be implemented by XOR'ing the further information with the a priori information.

According to various embodiments, the further information may include or may be a priori information masked based on a further cyclic redundancy check code.

According to various embodiments, the further information may include or may be a priori information masked based on a forward error correction code. A variant of the further information may be implemented by XOR'ing (exclusive or) the a priori information with the repeated parts (or part) of a repetition code. In other words: the further information may include or may be a repetition code, wherein the further information may include or may be a priori information XOR'd with at least one repeated part of a repetition code (in other words: the further information may include or may be a result of an XOR operation with the a priori information and the at least one repeated part of the repetition code as inputs).

According to various embodiments, the a priori information may be based on an identifier of the null data packet.

According to various embodiments, the a priori information may be based on a sequence number of the null data packet.

According to various embodiments, the a priori information may be based on a concatenation of an identifier (or part of an identifier) of the null data packet and a sequence number (or part of a sequence number) of the null data packet.

According to various embodiments, the further information may include or may be at least one extra symbol.

According to various embodiments, the at least one extra symbol may include or may be at least one orthogonal frequency-division multiplexing symbol.

Figure 1C:
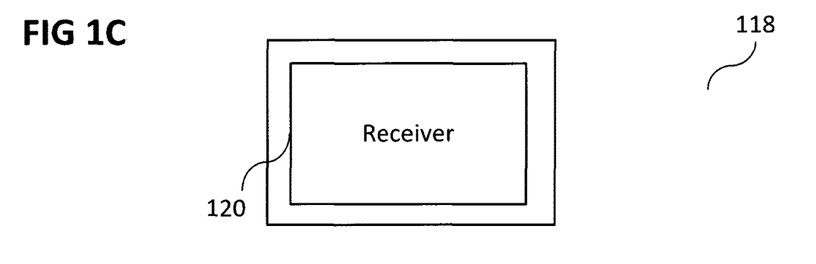
FIG. 1C shows an access point according to various embodiments.

FIG. 1C shows an access point 118 according to various embodiments. The access point 118 may include: a receiver 120 configured to receive a null data packet. The null data packet may include acknowledgement data indicating acknowledgements for a plurality of packets. The null data packet may include a cyclic redundancy check field configured to provide information based on which the null data packet may be checked for errors. The null data packet may include further information based on which the acknowledgements may be checked for errors.

According to various embodiments, the null data packet may include a cyclic redundancy check field configured to provide information based on which the acknowledgements may be checked for errors.

According to various embodiments, the further information may include or may be the acknowledgements which are encoded.

According to various embodiments, the acknowledgements which are encoded may be provided as the acknowledgement data to enable checking for errors in the acknowledgements.

According to various embodiments, the further information may include or may be the acknowledgements which are processed using a forward error correction code. A variant of a forward error correction code is a repetition code, where the acknowledgements are repeated.

According to various embodiments, the acknowledgements which are processed using a forward error correction code may be provided as the acknowledgement data.

According to various embodiments, the null data packet may include a reduced number of bits for a BAID field and an increased number of bits for the acknowledgement data.

According to various embodiments, the further information may include or may be additional bits for the cyclic redundancy check field.

According to various embodiments, the null data packet may include a reduced number of bits for a BAID field, a reduced number of bits for the acknowledgement data, and an increased number of bits in the cyclic redundancy check field.

According to various embodiments, the further information may include or may be a further cyclic redundancy check field.

According to various embodiments, the null data packet may include a reduced number of bits for a BAID field, with a size reduced by a size of the further cyclic redundancy check field.

According to various embodiments, the null data packet may include a reduced number of bits for the acknowledgement data, reduced by a size of the further cyclic redundancy check field.

According to various embodiments, the null data packet may include a reduced number of bits for a BAID field and a reduced number of bits for the acknowledgement data, reduced in sum by a size of the further cyclic redundancy check field.

According to various embodiments, the further information may include or may be masked a priori information.

According to various embodiments, the masking operation may be implemented by XOR'ing the further information with the a priori information.

According to various embodiments, the further information may include or may be a priori information masked based on a further cyclic redundancy check code.

According to various embodiments, the further information may include or may be a priori information masked based on a forward error correction code. A variant of the further information may be implemented by XOR'ing the a priori information with the repeated parts (or part) of a repetition code. The further information may include or may be a priori information XOR'd with the repeated parts (or repeated part) of a repetition code.

According to various embodiments, the a priori information may be based on an identifier of the null data packet.

According to various embodiments, the a priori information may be based on a sequence number of the null data packet.

According to various embodiments, the a priori information may be based on a concatenation of an identifier (or part of an identifier) of the null data packet and a sequence number (or part of a sequence number) of the null data packet.

According to various embodiments, the access point 118 may be configured to determine whether the null data packet is received properly based on the cyclic redundancy check field.

According to various embodiments, the access point 118 may be configured to determine whether the null data packet is received properly based on the further information.

According to various embodiments, the access point 118 may be configured to determine whether the null data packet is received properly based on the masked information. An implementation of the masking operation is performed by XOR'ing the further information with the a priori information.

According to various embodiments, the access point 118 may be configured to correct an error (or errors) in the null data packet based on the further information.

According to various embodiments, the access point 118 may be configured to correct an error (or errors) in the null data packet based on the further information masked with the a priori information. An implementation of the masking operation is performed by XOR'ing the further information with the a priori information.

According to various embodiments, the further information may include or may be at least one extra symbol.

According to various embodiments, the at least one extra symbol may include or may be at least one orthogonal frequency-division multiplexing symbol.

Figure 1D:
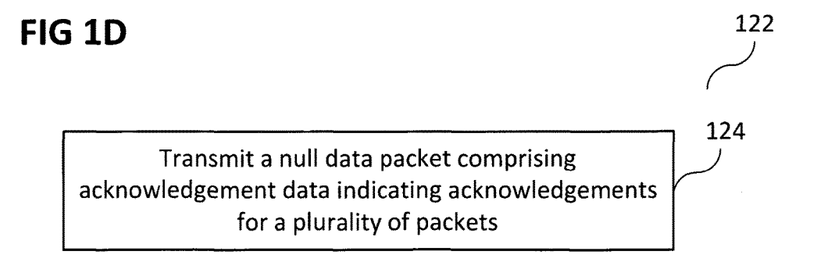
FIG. 1D shows a flow diagram illustrating a method for controlling a radio communication device.

FIG. 1D shows a flow diagram 122 illustrating a method for controlling a radio communication device. In 124, a null data packet may be transmitted. The null data packet may include acknowledgement data indicating acknowledgements for a plurality of packets. The null data packet may include a cyclic redundancy check field configured to provide information based on which the null data packet may be checked for errors. The null data packet may include further information based on which the acknowledgements may be checked for errors.

According to various embodiments, the null data packet may include a cyclic redundancy check field configured to provide information based on which the acknowledgements may be checked for errors.

According to various embodiments, the further information may include or may be the acknowledgements which are encoded.

According to various embodiments, the acknowledgements which are encoded may be provided as the acknowledgement data to enable checking for errors in the acknowledgements.

According to various embodiments, the further information may include or may be the acknowledgements which are processed using a forward error correction code. A variant of a forward error correction code is a repetition code, where the acknowledgements are repeated.

According to various embodiments, the acknowledgements which are processed using a forward error correction code may be provided as the acknowledgement data.

According to various embodiments, the null data packet may include a reduced number of bits for a BAID field and an increased number of bits for the acknowledgement data.

According to various embodiments, the further information may include additional bits for the cyclic redundancy check field.

According to various embodiments, the null data packet may include a reduced number of bits for a BAID field, a reduced number of bits for the acknowledgement data, and an increased number of bits in the cyclic redundancy check field.

According to various embodiments, the further information may include or may be a further cyclic redundancy check field.

According to various embodiments, the null data packet may include a reduced number of bits for a BAID field, with a size reduced by a size of the further cyclic redundancy check field.

According to various embodiments, the null data packet may include a reduced number of bits for the acknowledgement data, reduced by a size of the further cyclic redundancy check field.

According to various embodiments, the null data packet may include a reduced number of bits for a BAID field and a reduced number of bits for the acknowledgement data, reduced in sum by a size of the further cyclic redundancy check field.

According to various embodiments, the further information may include or may be masked a priori information.

According to various embodiments, the masking operation may be implemented by XOR'ing the further information with the a priori information.

According to various embodiments, the further information may include or may be a priori information masked based on a further cyclic redundancy check code.

According to various embodiments, the further information may include or may be a priori information masked based on a forward error correction code. A variant of the further information may be implemented by XOR'ing the a priori information with the repeated parts (or part) of a repetition code. The further information may include or may be a priori information XOR'd with the repeated part (or part) of a repetition code.

According to various embodiments, the a priori information may be based on an identifier of the null data packet.

According to various embodiments, the a priori information may be based on a sequence number of the null data packet.

According to various embodiments, the a priori information may be based on a concatenation of an identifier (or part of an identifier) of the null data packet and a sequence number (or part of a sequence number) of the null data packet.

According to various embodiments, the further information may include or may be at least one extra symbol.

According to various embodiments, the at least one extra symbol may include or may be at least one orthogonal frequency-division multiplexing symbol.

Figure 1E:
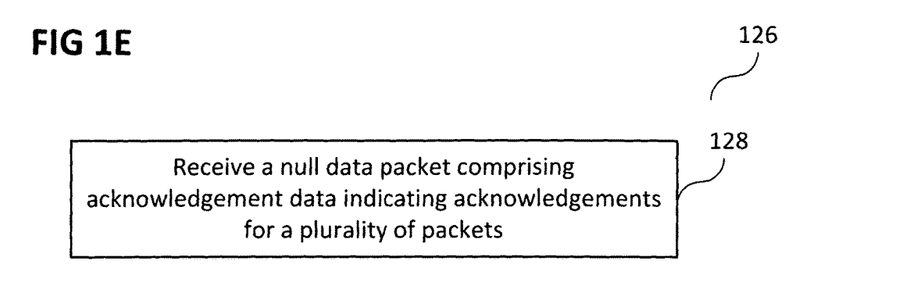
FIG. 1E shows a flow diagram illustrating a method for controlling an access point according to various embodiments.

FIG. 1E shows a flow diagram 126 illustrating a method for controlling an access point according to various embodiments. In 128, a null data packet may be received. The null data packet may include acknowledgement data indicating acknowledgements for a plurality of packets. The null data packet may include a cyclic redundancy check field configured to provide information based on which the null data packet may be checked for errors. The null data packet may include further information based on which the acknowledgements may be checked for errors.

According to various embodiments, the null data packet may include a cyclic redundancy check field configured to provide information based on which the acknowledgements may be checked for errors.

According to various embodiments, the further information may include or may be the acknowledgements which are encoded.

According to various embodiments, the acknowledgements which are encoded may be provided as the acknowledgement data to enable checking for errors in the acknowledgements.

According to various embodiments, the further information may include or may be the acknowledgements which are processed using a forward error correction code. A variant of a forward error correction code is a repetition code, where the acknowledgements are repeated.

According to various embodiments, the acknowledgements which are processed using a forward error correction code may be provided as the acknowledgement data.

According to various embodiments, the null data packet may include a reduced number of bits for a BAID field and an increased number of bits for the acknowledgement data.

According to various embodiments, the further information may include or may be additional bits for the cyclic redundancy check field.

According to various embodiments, the null data packet may include a reduced number of bits for a BAID field, a reduced number of bits for the acknowledgement data, and an increased number of bits in the cyclic redundancy check field.

According to various embodiments, the further information may include or may be a further cyclic redundancy check field.

According to various embodiments, the null data packet may include a reduced number of bits for a BAID field, with a size reduced by a size of the further cyclic redundancy check field.

According to various embodiments, the null data packet may include a reduced number of bits for the acknowledgement data, reduced by a size of the further cyclic redundancy check field.

According to various embodiments, the null data packet may include a reduced number of bits for a BAID field and a reduced number of bits for the acknowledgement data, reduced in sum by a size of the further cyclic redundancy check field.

According to various embodiments, the further information may include or may be masked a priori information.

According to various embodiments, the masking operation may be implemented by XOR'ing the further information with the a priori information.

According to various embodiments, the further information may include or may be a priori information masked based on a further cyclic redundancy check code.

According to various embodiments, the further information may include or may be a priori information masked based on a forward error correction code. A variant of the further information may be implemented by XOR'ing the a priori information with the repeated parts (or part) of a repetition code.

According to various embodiments, the a priori information may be based on an identifier of the null data packet.

According to various embodiments, the a priori information may be based on a sequence number of the null data packet.

According to various embodiments, the a priori information may be based on a concatenation of an identifier (or part of an identifier) of the null data packet and a sequence number (or part of a sequence number) of the null data packet.

According to various embodiments, the method may further include determining whether the null data packet is received properly based on the cyclic redundancy check field.

According to various embodiments, the method may further include determining whether the null data packet is received properly based on the further information.

According to various embodiments, the method may further include determining whether the null data packet is received properly based on the masked information. An implementation of the masking operation is performed by XOR'ing the further information with the a priori information.

According to various embodiments, the method may further include correcting an error (or errors) in the null data packet based on the further information.

According to various embodiments, the method may further include correcting an error (or errors) in the null data packet based on the further information masked with the a priori information. An implementation of the masking operation is performed by XOR'ing the further information with the a priori information.

According to various embodiments, the further information may include or may be at least one extra symbol.

According to various embodiments, the at least one extra symbol may include or may be at least one orthogonal frequency-division multiplexing symbol.

According to various embodiments, various devices and methods may be provided to solve the problems in BA.

According to various embodiments, devices and methods may be provided which reduce the aforementioned false positive problem when shorter and lowest rate BA frames with weaker integrity protection are used.

In the following, the most common scenario is described. The data originating STA is referred as the AP and the acknowledging STA is referred as an associated non-AP STA, since an AP generally has higher radio capability and transmit power than a STA. The same procedures can be, however, applied to any two communicating STAs.

In the following, robust BA with lower data rate will be described.

In the following, short BA with reduced false positives according to various embodiments will be described.

According to various embodiments, BA may be allowed to be transmitted as a Null Data Packet (NDP), which may also be referred to as short BA. NDP packets may be PHY layer headers without any PHY data payload, transmitted at the lowest data rate. This may allow the BA to be transmitted using the most reliable data rate but not occupy large channel time as there is no PHY payload. The number of available bits in these packets may be small: for example 26 bits or 36 bits for 1 MHz channel and 34 bits or 48 bits for 2 MHz channel. There may also be limited integrity protection with only a 4-bit CRC.

When used in a BA operation, the false positive arising from the limited 4-bit CRC may have any of the following consequences:

False Acknowledgement: the AP may receive a '1' in the BA bitmap when the STA actually sent a '0'. This may cause the AP to drop a data frame before the STA receives it and may mislead the STA in evaluating packet delivery rates.

Extra (in other words: unnecessary) Retransmission: the AP receives a '0' in the BA bitmap when the STA actually sent a '1'. This may cause the AP to retransmit the data frame when the STA has already received it. This wastes the precious radio resource.

BA frame addressed to another transmitter or addressed from another receiver.

BA frame acknowledges the wrong data frame sequence number.

False positives resulting in the last two consequences may have little impact since the probability of two STAs using the channel approximately at the same time is low for the last second case, and the two communicating STAs may detect the wrong frame sequence number when it goes out of sync.

The first two consequences, however, may be more severe consequences. There is a need to reduce false positives due to the limited capability of a 4-bit CRC check. In comparison to normal BA which is a MAC (Media access control) layer control packet, there may be a 32-bit CRC protection and has many times higher integrity protection than the 4-bit check.

According to various embodiments, devices and methods may be provided which reduce the possibility of a false positive brought upon by Short BA, for example in the current IEEE 802.11ah standard working draft, through different ways of incorporating extra CRC/FEC protection into the limited number of available bits in NDP type frames.

According to various embodiments, devices and methods for short Block Acknowledgement operation and channel access for IEEE 802.11 ah networks may be provided.

In the following, further details on short BA will be described.

Figure 2:
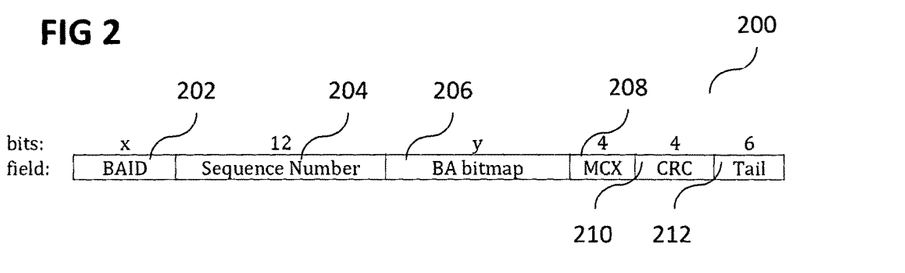
FIG. 2 shows an illustration of an NDP (null data packet) format for BA (block acknowledgement)

FIG. 2 shows an illustration 200 of an NDP format for BA. A BAID (BA identifier) field 202 of for example x (with an integer number x) bits, a sequence number field 204 of for example 12 bits, a BA bitmap field 206 of for example y (with an integer number y) bits, an MCX (multiplexer) field 208 of for example 4 bits, a CRC (cyclic redundancy check) field 210 of for example 4 bits, and a tail field of for example 6 bits may be provided in the NDP according to various embodiments shown in FIG. 2. For example, for 1 MHz, x+y=10 bits. For 2 MHz, x+y=22 bits.

FIG. 2 shows the format according to various embodiments for a NDP type BA, which may also be referred to as a short BA. It will be understood that only the required fields are shown, and that the exact position of the fields may change and may not be contiguous as well. The fields BAID 202 and sequence number 204 together form an identifier for the acknowledging STA to identify the AP and the sequence number of the first data frame to be acknowledged in the bitmap. The MCX field 208 may be used to multiplex between normal SIG field ("Signal field") and all other NDP type frames. It is illustrated as 4 bits in length but could be of other variable lengths in order to support the number of NDP type frames.

The BA bitmap 206 corresponds to acknowledging data frames. If a 8-bit BA bitmap is to be supported for 1 MHz channel, then BAID has only 2 bits. If a 16-bit BA bitmap is to be supported for 2 MHz channel, then BAID has 8 bits. The larger the number of bits for BAID, the less likelihood that the BA frame would be addressed to other STAs. Table 4 shows the number of assignable bits between BAID and BA bitmap for 1 MHz and 2 MHz channels.

TABLE 1

| Number of assignable bits | | |
| --- | --- | --- |
|  | 1 MHz | 2 MHz |
| MCS index | MCS0rep2 | MCS0 |
| Bits/symbol | 6 | 24 |
| No of OFDM symbols | 6 | 2 |
| Total NDP bits | 36 | 48 |

TABLE 1-continued

| Number of assignable bits | | |
| --- | --- | --- |
|  | 1 MHz | 2 MHz |
| MCS + CRC + Tail bits | 14 | 14 |
| Sequence Number bits | 12 | 12 |
| BAID + bitmap bits (x + y) | 10 | 22 |

In the following, various devices and method according to various embodiments to reduce the BA false positives at the AP for False Acknowledgement and Unnecessary Retransmission will be described.

According to various embodiments, devices and methods may be provided to reduce the effective bitmap size with FEC (forward error correction).

Figure 3:
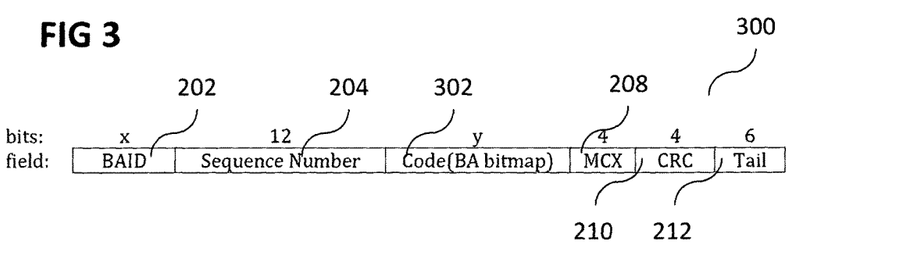
FIG. 3 shows an illustration of an NDP format according to various embodiments, in which the bitmap size is reduced.

FIG. 3 shows an illustration 300 of an NDP format according to various embodiments, in which the bitmap size is reduced. Various fields in the NDP format as shown in FIG. 3 may be similar or identical to the NDP format as shown in FIG. 2, so that the same reference signs may be used and duplicate description may be omitted.

As shown in FIG. 3, the BA bitmap may be replaced by a code word to reduce the false positive rate for BA bitmap, which may be provided in a Code (BA bitmap) field 302 of for example y bits. For example, the Forward Error Correction (FEC) code (denoted by the standard (n,k,d) where n is the length of the code, k is the number of information bits, and d is the minimum distance) may be (8, 4, 4) or (8, 5, 2) where the effective bitmap size is 4 and 5 bits respectively, with error-check capability of at least 3 and 1 bits, and error-correcting capability of at most 2 bits or 1 bit respectively.

According to various embodiments, devices and methods may be provided to reduce BAID bits or remove it entirely.

Figure 4:
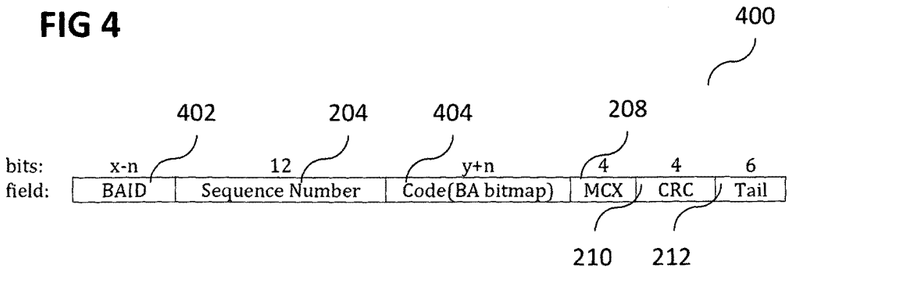
FIG. 4 shows an illustration of an NDP format according to various embodiments, in which BAID (BA identifier) is reduced or removed.

FIG. 4 shows an illustration 400 of an NDP format according to various embodiments, in which BAID is reduced or removed, like indicated in field 402. Various fields in the NDP format as shown in FIG. 4 may be similar or identical to the NDP format as shown in FIG. 2, so that the same reference signs may be used and duplicate description may be omitted.

FIG. 4 shows the NDP format for reducing BAID by n bits (the entire BAID is removed if x=n) and using those bits to reduce the false positive rate for BA bitmap through coding in field 404. For example, for y=8, n=x=2, the FEC code could be (10, 8, 2). This gives an error-check capability of at least 1 bit and error-correcting capability of at most 1 bit for the BA bitmap.

According to various embodiments, devices and methods may be provided to reduce or remove BAID and reduce the bitmap size. The false positive rate as described above may be further reduced through shrinking the effective size of the BA bitmap in the y+n bit code word. An example would be to use FEC (10, 4, 4) for the case where y=8 and n=x=2. This gives an error-check capability of at least 3 bits and error-correcting capability of at most 2 bits for the BA bitmap. It may be stronger than the (8, 4, 4) code as described above.

According to various embodiments, devices and methods may be provided to increase the number of CRC bits in the NDP by reducing the number of bits from BAID, bitmap or both.

Figure 5:
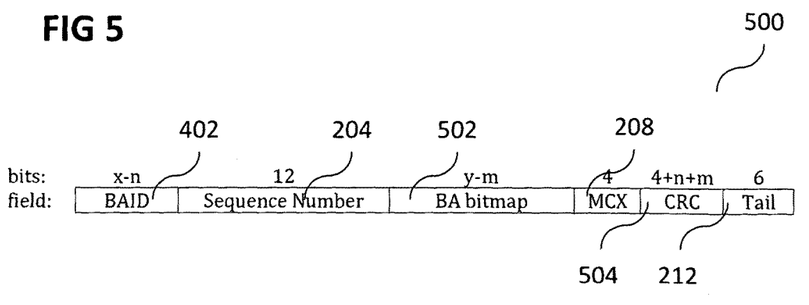
FIG. 5 shows an illustration of increasing CRC (cyclic redundancy check) bits according to various embodiments.

FIG. 5 shows an illustration 500 of increasing CRC bits (like indicated in field 504, for example to 4+n+m bits) according to various embodiments. Various fields in the NDP format as shown in FIG. 5 may be similar or identical to the NDP format as shown in FIG. 2 or FIG. 4, so that the same reference signs may be used and duplicate description may be omitted. BA bitmap field 502 may have for example y-m bits.

The false positive problem arises due to the insufficiency of the 4-bit CRC. One remedial method according to various embodiments may be to reduce the bits from BAID and/or BA bitmap to increase the strength of the CRC, e.g., a 8-bit CRC with m=n=x=2. If the bitmap size is not reduced, a 6-bit CRC may be used. A side benefit may be that the sequence number is protected by a stronger CRC but the overall performance may not be better than the previous three methods.

For 2 MHz channel, there may be more room for improvement for all four methods since there are more available bits (x+y=22). According to various embodiments, the bit assignments in the method described above may be permutated with an increased CRC to give protection to the sequence number while reducing false positives for the bitmap.

The caveat for increasing bits for CRC may then be every receiver would have to run two CRC checks for every decodeable signal: one for the usual 4-bit CRC for non-NDP BA packets, and another CRC specially for NDP BA packets. This may increase implementation complexity.

According to various embodiments, additional OFDM (Orthogonal frequency-division multiplexing) Symbols may be added to NDP.

According to various embodiments, according to Table 1, the number of OFDM symbols in the 1 MHz channel may be limited to 6 OFDM symbols and has 12 less bits than the 2 MHz channel. One method to increase the number of bits for assignment for BAID, BA bitmap and CRC may be to add additional OFDM symbols to the NDP packet. This can be done in several ways as described below.

According to various embodiments, one or two additional OFDM symbols, which carry 6 or 12 bits, respectively, can be added to the PHY layer header. If two OFDM symbols are added, this will give the 1 MHz NDP packet the same number of bits as the 2 MHz channel and hence the same degree of freedom in assigning bits for BAID, BA bitmap and CRC. For example, the CRC can be increased to a much stronger 16-bit and leaving the BAID and bitmap to be the same 10 bits for 1 MHz. Another extreme is to have a (20, 8, 8) code for the BA bitmap while leaving 2 bits to BAID and CRC to the same 4 bits. Alternatively, if one OFDM symbol is added, the CRC may be increased to 8-bit, or, in the extreme case, a (14, 8, 4) code may be used while leaving 2 bits to BAID and CRC to the same 4 bits.

According to various embodiments, one or two additional OFDM symbols, which carry 6 or 12 bits respectively, may be added after the PHY layer header. Here the PHY layer header still may have a 4-bit. CRC. If one additional symbol is added and an 8-bit CRC overall is desired, the CRC for the PHY layer header can be the 4 least significant bits of the 8-bit CRC, while the 4 most significant bits are carried in the additional OFDM symbol. The bit order can be interchanged.

Similarly, when two additional OFDM symbols are added and a 16-bit CRC overall is desired, the CRC for the PHY layer header may be the 4 least significant bits of the 16-bit CRC, while the 12 most significant bits are carried in the additional OFDM symbols. On the other hand, if the extra bits are to be used for a (14, 8, 4) code for one additional symbol and a (20, 8, 8) code for two additional symbols, respectively, then the PHY layer header can use the original 4-bit CRC while the extra bits carried by the additional symbol(s) will carry the additional coded information.

According to various embodiments, the various methods for reducing the false positive may be the various ways to re-assign the number of bits for each field and add FEC to the BA bitmap and/or increase CRC protection.

Figure 6:
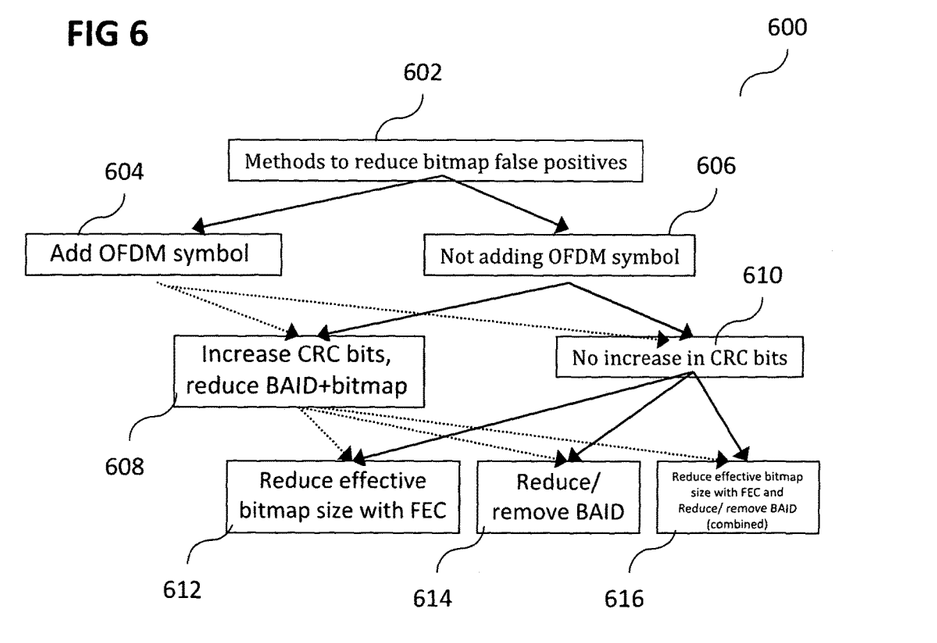
FIG. 6 shows an illustration of organizing of methods to reduce BA bitmap false positives according to various embodiments.

FIG. 6 shows an illustration 600 of organizing of methods to reduce BA bitmap false positives according to various embodiments. In other words, FIG. 6 shows a hierarchical organization of the methods described above and how they may be combined in various ways to re-assign the bits for each field. Methods to reduce bitmap false positives (like indicated in 602) may either add OFDM symbol (604) or not (606). Furthermore, CRC bits may be increased and BAID and bitmap size may be reduced (608) or not (610). The effective bitmap size with FEC may be reduced (612). BAID may be reduced/removed (614). The effective bitmap size with FEC may be reduced and BAID may be reduced/removed (616).

Figure 7:
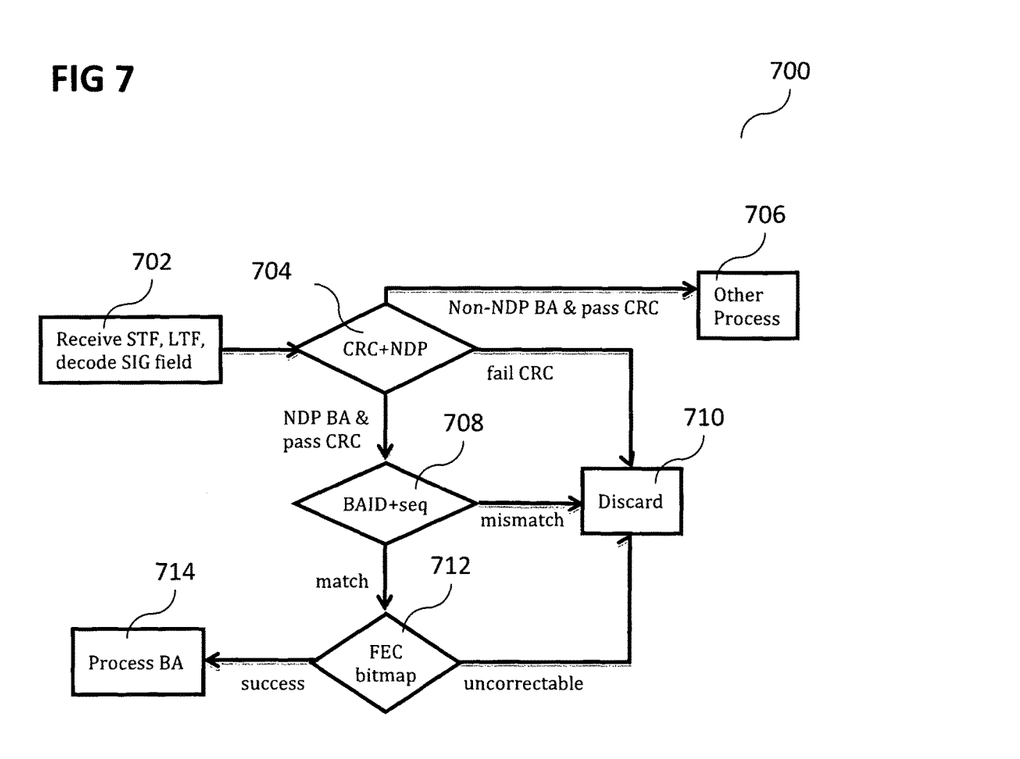
FIG. 7 shows a flow diagram illustrating a decision flow for decoding BA NDP according to various embodiments.

FIG. 7 shows a flow diagram 700 illustrating a decision flow for decoding BA NDP according to various embodiments (in other words: shows an NDP BA packets decode flow). FIG. 7 shows the decision flow for decoding a NDP BA packet at the AP. Once the AP has decoded the SIG field (702), it may determine in 704 if the CRC has passed and also if the packet is a NDP BA packet through the multiplexing field (MCX, but could possibly be other fields as well). Since CRC bits may be different for usual packets and NDP BA packets, two CRC and multiplexer checks may be performed before concluding if the packet has passed CRC check. NDP BA packets that fail CRC checks are discarded in 710.

If the packet is a non NDP BA and CRC is passed, another process 706 may be carried out. If the packet is a NDP BA, the AP then checks in 708 whether the BAID and sequence number matches what is expected at the AP. Unexpected numbers and BAID are possibly meant for other STAs and may be discarded in 710.

Furthermore, the bitmap may undergo a second round of FEC check in 712 and error correction is attempted. Uncorrectable bitmaps may be discarded in 710 and this may reduce the false positives in BA bitmap and hence lower the rate of false acknowledgements and unnecessary retransmissions. Successful FEC check or successful error correction may lead to processing the BA in 714.

According to various embodiments, devices and methods may be provided which may address a false positive issue in the BA bitmap for NDP-type BA packets due to a limited 4-bit CRC protection. The methods described may add and reassign bits for BAID and bitmap and introduce FEC into the bitmap in order to reduce the false positive rate. This may help reduce the possibility of severe consequences such as false acknowledgements or unnecessary retransmissions.

Figure 8:
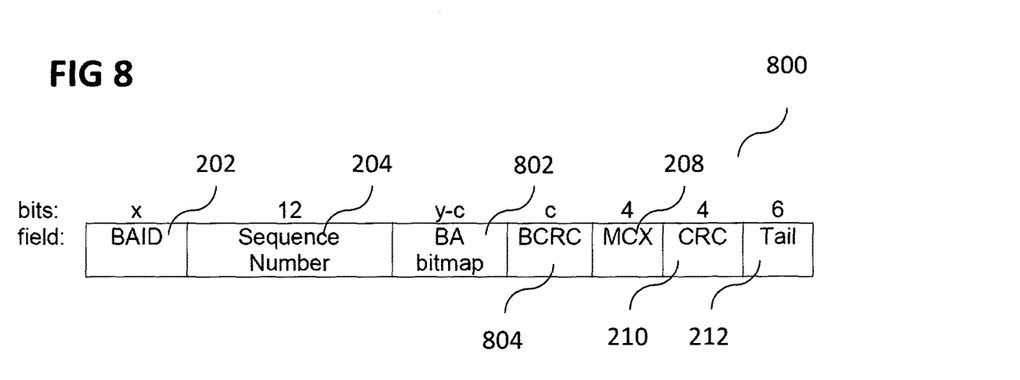
FIG. 8 shows an illustration of reducing the (effective) bitmap size and adding secondary CRC according to various embodiments.

FIG. 8 shows an illustration 800 of reducing the (effective) bitmap size and adding secondary CRC according to various embodiments. Various fields in the NDP format as shown in FIG. 8 may be similar or identical to the NDP format as shown in FIG. 2, so that the same reference signs may be used and duplicate description may be omitted.

As shown in FIG. 8, the BA bitmap 802 may be shortened by c bits to reduce the false positive rate for BA bitmap. The BA bitmap 802 may further protected by a second CRC (BCRC) 804 of c bits. The original 4-bit CRC 210 may still be unchanged and may be functionally the same as within the original SIG field (regular PHY header) and possibly other NDP type frames.

Figure 9:
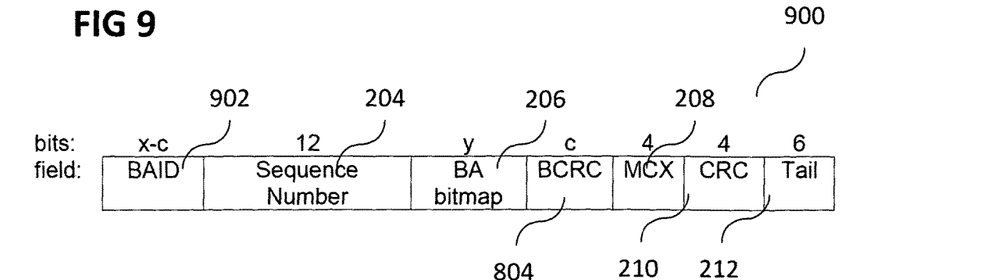
FIG. 9 shows an illustration of reducing or eliminating BAID and adding secondary CRC according to various embodiments.

FIG. 9 shows an illustration 900 of reducing or eliminating BAID and adding secondary CRC according to various embodiments. Various fields in the NDP format as shown in FIG. 9 may be similar or identical to the NDP format as shown in FIG. 2 or FIG. 8, so that the same reference signs may be used and duplicate description may be omitted.

As shown in FIG. 9, the BAID 902 may be shortened by c bits to make space for the second CRC (BCRC) 804 of c bits. The original 4-bit CRC 210 may still be unchanged and may functionally be the same as within the original SIG field (regular PHY header) and possibly other NDP type frames.

Figure 10:
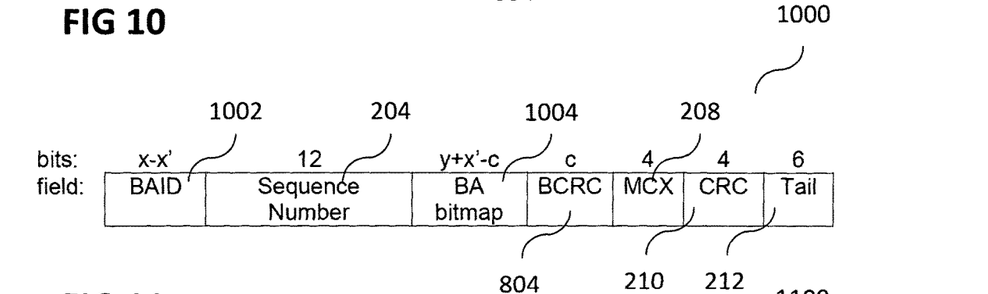
FIG. 10 shows an illustration of adding secondary CRC, reducing effective bitmap size, and reducing or eliminating BAID according to various embodiments.

FIG. 10 shows an illustration 1000 of adding secondary CRC, reducing effective bitmap size, and reducing or eliminating BAID according to various embodiments. Various fields in the NDP format as shown in FIG. 10 may be similar or identical to the NDP format as shown in FIG. 2 or FIG. 8, so that the same reference signs may be used and duplicate description may be omitted.

As shown in FIG. 10, the BAID 1002 may be shortened by x' bits and the BA bitmap 1004 may be further reduced to make space for the second CRC (BCRC) 802 of c bits. The original 4-bit CRC 210 may still be unchanged and may functionally be the same as within the original SIG field (regular PHY header) and possibly other NDP type frames.

Figure 11:
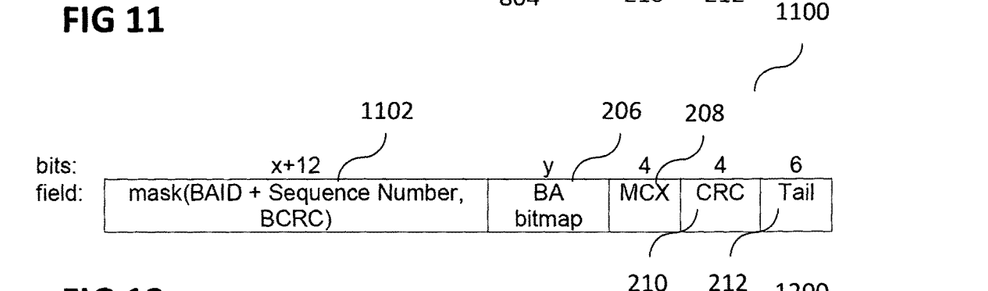
FIG. 11 shows an illustration of masking secondary CRC with a priori information to retain the bitmap size according to various embodiments.

FIG. 11 shows an illustration 1100 of masking secondary CRC with a priori information to retain the bitmap size according to various embodiments. Various fields in the NDP format as shown in FIG. 11 may be similar or identical to the NDP format as shown in FIG. 2, so that the same reference signs may be used and duplicate description may be omitted.

According to various embodiments, the effective bitmap size may be retained, secondary CRC may be added, and it may be masked it with a priori information.

FIG. 11 shows the NDP format for introducing secondary CRC over the BA bitmap to reduce the false positive rate but allows the bitmap size to be unchanged through masking with a priori information.

Any a priori information can be used for CRC-masking. In this case, it may be BAID and sequence number so long as both are known to the BA sender and BA receiver before the transmission of the short BA. The length of the secondary CRC over the BA bitmap is c≤x+12 bits. Masking for the x+12 bits (which may be provided in field 1102) is done as follows:

1. Compute BCRC over BA bitmap.
2. Mask=(BAID+Sequence Number) XOR (BCRC+pad bits)

The pad bits for the BCRC may be '1's or '0's to make up x+12 bits and may be in LSB, MSB or in any interleaved order so long as both BA receiver and sender have this a priori information.

To check if the BA bitmap is received correctly, the BA receiver may perform the following steps:

1. Sym=(Mask) XOR (BAID+Sequence Number)
2. Pass if Sym equals (computed CRC(bitmap)+pad bits).

A variant of the masking operation is to remove the pad bits and compute the partial mask as (part of BAID+Sequence Number) XOR BCRC. The other part of the mask consists of the part of (BAID+Sequence Number) not involved in the XOR operation. In this case the BA sender does the following:

1. Compute BCRC over BA bitmap.
2. Partial Mask=(part of BAID+Sequence Number) XOR (BCRC).

To check if the BA bitmap is received correctly, the BA receiver may perform the following steps:

1. Sym=(Partial Mask) XOR (part of BAID+Sequence Number)
2. Pass if Sym equals (computed CRC(bitmap))

Figure 12:
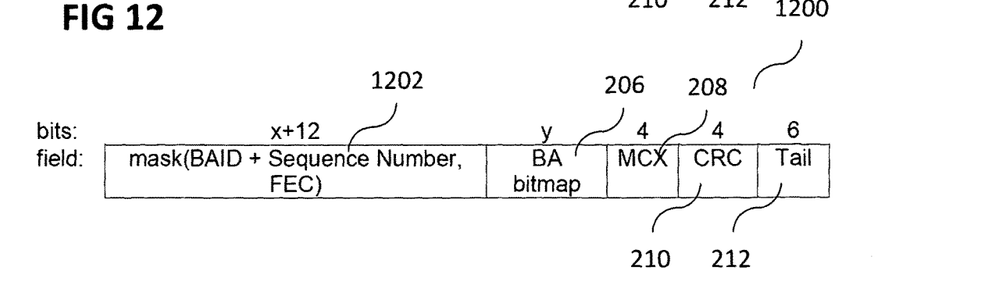
FIG. 12 shows an illustration of masking FEC (forward error correction code) with a priori information to retain the bitmap size according to various embodiments.

FIG. 12 shows an illustration 1200 of masking FEC with a priori information to retain the bitmap size according to various embodiments. Various fields in the NDP format as shown in FIG. 12 may be similar or identical to the NDP format as shown in FIG. 2, so that the same reference signs may be used and duplicate description may be omitted.

According to various embodiments, the effective bitmap size may be retained, FEC may be added and it may be masked with a priori information and provided in field 1202. This method may be similar to the previous method except that a systematic FEC over the BA bitmap is used instead of a secondary CRC, which only provides error-checking capabilities but not error-correcting capabilities. The codeword for the FEC is of length y+c bits where c≤x+12 bits for masking. Masking is done as follows:

1. Compute FEC over BA bitmap.
2. Mask=(BAID+Sequence Number) XOR (FEC parity check bits+pad bits)

The pad bits for the BCRC can be '1's or '0's to make up x+12 bits and can be in LSB, MSB or in any interleaved order so long as both BA receiver and sender have this a priori information. To recover the FEC parity check bits, the BA receiver performs the following steps:

1. Sym=(Mask) XOR (BAID+Sequence Number);
2. Pass if the pad bits of Sym are correct, i.e., equals the bits used by BA sender;
3. FEC parity check bits=Sym less pad bits.

A variant of the masking operation is to remove the pad bits and compute the partial mask as (part of BAID+Sequence Number) XOR (FEC parity check bits). The other part of the mask consists of the part of (BAID+Sequence Number) not involved in the XOR operation. In this case the BA sender does the following:

1. Compute FEC over BA bitmap.
2. Partial Mask=(part of BAID+Sequence Number) XOR (FEC parity check bits).

To recover the FEC parity check bits, the BA receiver may perform the following steps:

1. Sym=(Partial Mask) XOR (part of BAID+Sequence Number)
2. FEC parity check bits=Sym.

The received FEC codeword can then be reconstructed with concatenating the received BA bitmap with the FEC parity check bits obtained using the above procedure(s). Decoding is then done as per any FEC scheme.

FIG. 12 shows an illustration 1200 of masking FEC (repetition code over the BA bitmap) with a priori information. According to various embodiments, devices and methods may add FEC via repetition code over the BA bitmap and mask it with a priori information.

According to various embodiments, an FEC, which may be specifically a repetition code over the BA bitmap, may be used. The codeword for the repetition code is of length y+c bits where c=R*y, R=number of repetitions of the BA bitmap to be masked, and c≤x+12 bits for masking. Masking is done as follows:

1. Compute repetition code over BA bitmap; and
2. Mask=(BAID+Sequence Number) XOR (R*y repeated BA bitmap bits+pad bits).

The pad bits may be '1's or '0's to make up x+12 bits and can be in LSB, MSB or in any interleaved order so long as both BA receiver and sender have this a priori information.

To recover the R*y repeated BA bitmap bits, the BA receiver may perform the following steps:
1. Sym=(Mask) XOR (BAID+Sequence Number);
2. Pass if the pad bits of Sym are correct, i.e., equals the bits used by BA sender; and
3. R*y repeated BA bitmap bits=Sym less pad bits.

A variant of the masking operation is to remove the pad bits and compute the partial mask as (part of BAID+Sequence Number) XOR (R*y repeated BA bitmap bits). The other part of the mask consists of the part of (BAID+Sequence Number) not involved in the XOR operation. In this case the BA sender does the following:
1. Compute repetition code over BA bitmap; and
2. Partial Mask=(part of BAID+Sequence Number) XOR (R*y repeated BA bitmap bits).

To recover the R*y repeated BA bitmap bits, the BA receiver may perform the following steps:
1. Sym=(Partial Mask) XOR (part of BAID+Sequence Number)
2. R*y repeated BA bitmap bits=Sym.

The method described above is equivalent to performing y=(part of BAID+Sequence Number) XOR (R*y repeated BA bitmap bits) at the BA sender, and recovering the (R*y repeated BA bitmap bits) by performing y XOR (part of BAID+Sequence Number) at the BA receiver.

The received repetition codeword may then be reconstructed with concatenating the received BA bitmap with the R*y repeated BA bitmap bits obtained using the above procedure(s). Decoding is then be done by comparing the repeated parts.

It will be understood that the above described methods may be combined with the any one of the methods as described above in any combination, for example with adding OFDM symbol(s) to NDP type frame for B; with an increase in CRC bits for BA, with Reduce the effective bitmap size, adding secondary CRC; with reducing BAID or eliminating it completely, adding secondary CRC; with adding secondary CRC, reducing effective bitmap size, reducing or eliminating BAID; and/or retaining effective bitmap size, adding secondary CRC and masking it with a priori information.

In the following, further details on the decision flow for decoding BA NDP (in other words: the NDP BA packets decode flow) according to various embodiments will be given, referring back to FIG. 7.

FIG. 7 shows the decision flow for decoding a NDP BA packet at the AP. Once the AP has decoded the SIG field, it has to determine if the CRC (which may be known here as the primary CRC to distinguish it from the secondary CRC as described above) has passed and also if the packet is an NDP BA packet through the multiplexing field (MCX, but could possibly be other fields as well). Since CRC bits may be different for usual packets and NDP BA packets, two CRC and multiplexer checks must be performed before concluding if the packet has passed CRC check (essentially there is a primary CRC and a secondary CRC as described above). NDP BA packets that fail CRC checks are discarded. The order of the CRC and multiplexer checks needs to be noted. In a mixed reception mode where the AP may receive any of NDP BA packets, normal BA or data packets with different primary CRC lengths, then the AP needs to carry out the multiplexer check first before the primary CRC check to determine if the packet is an NDP BA packet or not, so that the AP may know what the primary CRC length is. On the other hand, if it is known that the AP were to receive all packets with the same primary CRC length, then the AP checks the primary CRC first before proceeding with the multiplexer check.

If the packet is a NDP BA, the AP then performs unmasking with BAID and sequence number (or part of BAID and sequence number) in 708 as described above. It is to be noted that in the case (for example CRC, FEC or repetition code) pad bits are not used, the XOR operation for checking expected BAID and sequence number (or the encoded part of BAID and sequence number) is also valid. Unexpected numbers and BAID are possibly meant for other STAs and may be discarded in 710.

Furthermore, the bitmap may undergo a second round of CRC, FEC or repetition code check and error correction may be attempted. Uncorrectable bitmaps will be discarded and this will reduce the false positives in BA bitmap and hence lower the rate of false acknowledgements and unnecessary retransmissions.

The devices and methods as described above address a false positive issue in the BA bitmap for NDP-type BA packets due to a limited 4-bit CRC protection. The methods described use an FEC in the form of a repetition code over the BA bitmap or add secondary CRC to the BA bitmap for additional protection and optionally make space for the new bits via masking. The variant using masking may utilize an FEC instead of the secondary CRC.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:
1. A radio communication device comprising:
a processor configured to generate a null data packet comprising acknowledgement data indicating acknowledgements for a plurality of packets; and
a transmitter configured to transmit the null data packet, wherein the null data packet further comprises:
a cyclic redundancy check field configured to provide information based on which the null data packet is able to be checked for errors, and
further information based on which the acknowledgements are able to be checked for errors, and
wherein the further information comprises a priori information masked based on a forward error correction code.
2. The radio communication device of claim 1, wherein the cyclic redundancy check field is configured to provide information based on which the acknowledgements are able to be checked for said errors.
3. The radio communication device of claim 1, wherein the further information further comprises the acknowledgements which are encoded.
4. The radio communication device of claim 3, wherein the acknowledgements which are encoded are provided as the acknowledgement data.
5. The radio communication device of claim 1, wherein the further information further comprises the acknowledgements which are processed using a second forward error correction code.
6. The radio communication device of claim 5, wherein the acknowledgements processed using the second forward error correction code are processed by a repetition code by repeating the acknowledgements.

7. The radio communication device of claim 5, wherein the acknowledgements which are processed using the second forward error correction code are provided as the acknowledgement data.

8. The radio communication device of claim 1, wherein the null data packet comprises a reduced number of bits for a Block Acknowledgement Identifier (BAID) field and an increased number of bits for the acknowledgement data.

9. The radio communication device of claim 1, wherein the further information further comprises additional bits for the cyclic redundancy check field.

10. The radio communication device of claim 1, wherein the null data packet comprises a reduced number of bits for a Block Acknowledgement Identifier (BAID) field, a reduced number of bits for the acknowledgement data, and an increased number of bits in the cyclic redundancy check field.

11. The radio communication device of claim 1, wherein the a priori information is masked based on the forward error correction code by XOR'ing the a priori information with the forward error correction code.

12. The radio communication device of claim 1, wherein the forward error correction code is a repetition code and the a priori information is masked based on the repetition code by XOR'ing the a priori information with at least one repeated part of the repetition code.

13. The radio communication device of claim 1, wherein the a priori information is based on an identifier of the null data packet.

14. The radio communication device of claim 1, wherein the a priori information is based on a sequence number of the null data packet.

15. The radio communication device of claim 1, wherein the a priori information is based on a concatenation of at least a part of an identifier of the null data packet and at least a part of a sequence number of the null data packet.

16. The radio communication device of claim 1, wherein the further information further comprises at least one extra symbol.

17. The radio communication device of claim 16, wherein the at least one extra symbol comprises at least one orthogonal frequency-division multiplexing symbol.

18. An access point comprising:
a receiver configured to receive a null data packet comprising:
acknowledgement data indicating acknowledgements for a plurality of packets,
a cyclic redundancy check field configured to provide information based on which the null data packet is able to be checked for errors, and
further information based on which the acknowledgements are able to be checked for errors,
wherein the further information comprises a priori information masked based on a forward error correction code; and
a processor configured to decode the further information to check for said errors in the acknowledgements.

19. The access point of claim 18, wherein the forward error correction code is a repetition code, and the a priori information is masked based on the repetition code by XOR'ing the a prior information with at least one repeated part of the repetition code, and the processor is configured to decode the masked a priori information to check for errors in the acknowledgements.

* * * * *